April 10, 1945.  R. CHELBORG ET AL  2,373,541
TOOL GUIDING APPARATUS
Filed Oct. 22, 1941
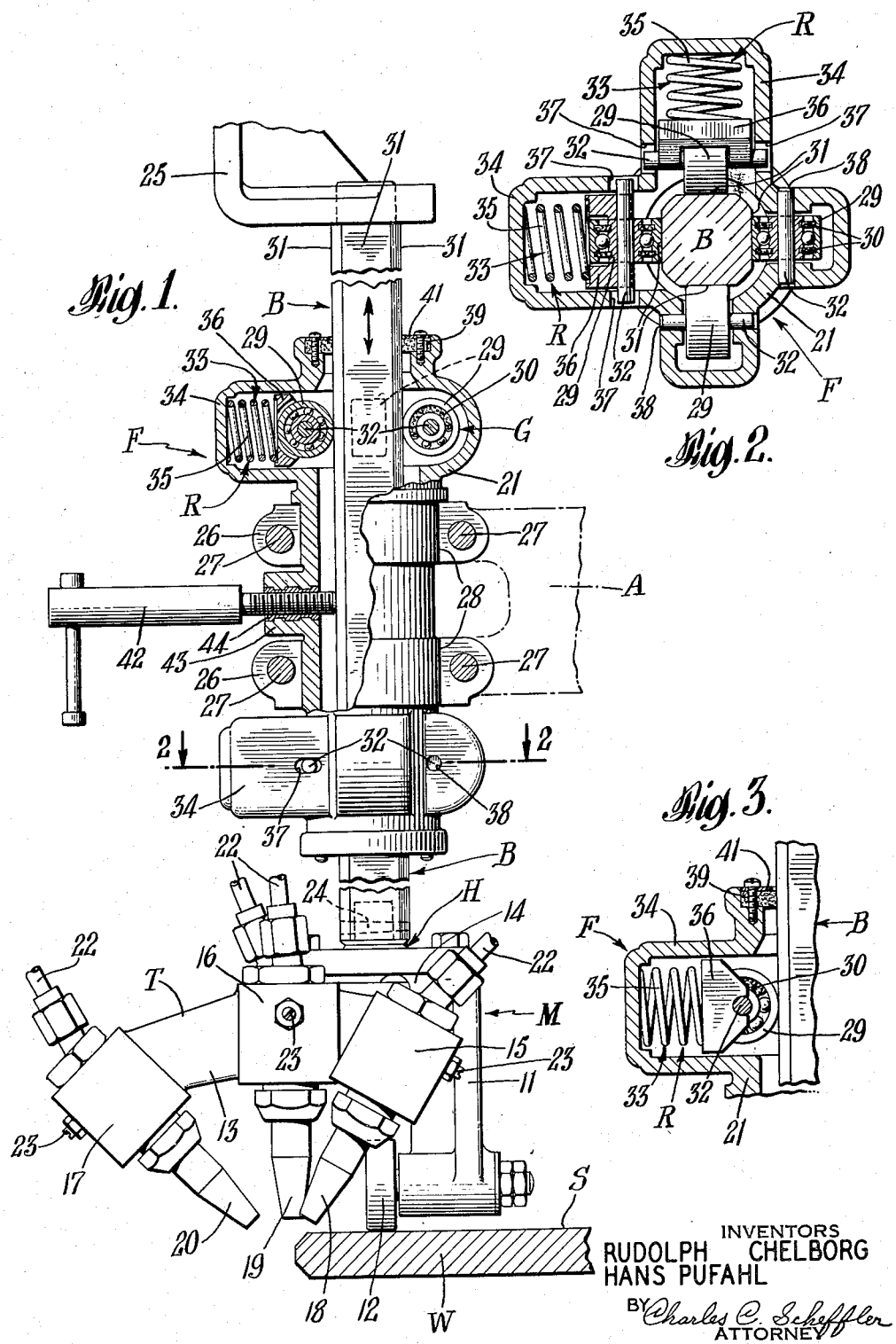
INVENTORS
RUDOLPH CHELBORG
HANS PUFAHL
BY Charles C. Scheffler
ATTORNEY Patented Apr. 10, 1945

UNITED STATES PATENT OFFICE 2,373,541

TOOL-GUIDING APPARATUS

Rudolph Chelborg, Maplewood, N. J., and Hans Pufahl, Port Chester, N. Y., assignors to Union Carbide and Carbon Corporation, a corporation of New York Application October 22, 1941, Serial No. 416,074

14 Claims. (Cl. 266—23)

This invention relates to tool-guiding apparatus of a type more generally referred to as plate-riding devices.

Devices of this type employ a floating support adapted to engage the surface of a workpiece along a predetermined path of travel, so as to maintain a blowpipe or other tool in predetermined relation to the work surface, irrespective of undulations or irregularities in the surface. Although plate-riding devices are useful with many forms of tools, a typical embodiment of the present invention is herein disclosed, in conjunction with a blowpipe head having nozzles positioned to perform double beveling and trimming operations along the edge of a metal plate by the flame-cutting process, though it will be understood that the improved apparatus in no sense is limited to blowpipes, nor to the specific form of blowpipe arrangement herein disclosed. Other types of blowpipe heads or nozzles which may be substituted for the presently-disclosed combination, include those for performing butt welding, strip welding, flame grooving or desurfacing, flame hardening, flame softening and flame priming.

It is common procedure in connection with many mechanical operations, and especially with blowpipe operations, to secure the tool to a propelling carriage for movement along the surface of the work to be treated, and to provide a floating tool support having a surface-engaging member secured to the tool support, so as to maintain the tool in predetermined relation to the work surface as the tool progresses along the desired path of travel. As an example, large steel deck plates for ships often are required to be cut accurately to size, while at the same time, scarfing or otherwise preparing the newly formed edges for subsequently welding the plates in location. Such plates usually are distorted from a plane condition at the time the blowpipe passes over the surface. In order to bevel or otherwise scarf the edge properly and accurately, the blowpipe or other tool must be maintained at a fixed angle and distance from the surface, irrespective of irregularities in the surface.

Various mechanisms such as vertical slideways and parallelogram-linkage mechanisms have been proposed, for supporting and propelling the blowpipe during such edge-forming operations, to provide the necessary floating action of the tool support on the work surface. Although efforts have been made to minimize the lost motion between the tool support and the propelling means, no fully satisfactory structure has been produced heretofore which combines free vertical floating action with complete lateral stability, independent of lost motion in all lateral directions. Even the slightest lateral deviation, produced for example by a small obstruction on the work surface, may seriously affect the quality of the work.

The principal objects of the present invention are: to provide an improved tool-guiding apparatus; to provide an improved roller-guide mechanism for a plate-riding device; to provide a plate-riding device having a slidable guide bar firmly held against lateral play in all directions; to provide a tool-guiding apparatus having a floating tool support guided by spring-loaded rollers; and to provide in such an apparatus mechanism for locking the device in fixed position, and mechanism for maintaining the faces of the guide bar free and clear of foreign particles. These and other objects of the present invention will become readily apparent from the annexed specification, and from the appended drawing which discloses one embodiment of the present invention.

In the drawing,

Fig. 1 is a front elevational view, with parts in section, of one form of the improved tool-guiding apparatus in operating position on a workplate or other body;

Fig. 2 is a cross-sectional view through the spring-loaded guide-roller mechanism, taken on the line 2—2 of Fig. 1; and, Fig. 3 is a detailed sectional view of the guide-roller mechanism, with certain of the parts in elevation.

Generally speaking, the invention comprises a frame F adapted to be propelled in any convenient manner over a work surface generally along the path of travel. A floating tool holder H, having a surface engaging member M, oscillates relatively to the frame F in accord with undulations in a work surface S, so as to maintain a tool T, such as a blowpipe, in predetermined relation to the work surface. A guide bar B extends upwardly from the member M, and is held against undesired lateral and twisting motion by a plurality of anti-friction devices such as guide rollers G journalled to the frame F. Resilient or spring means R urge at least some of the rolers G into engagement with the guide bar. These spring-loaded rollers compensate for wear and structural imperfections in the bar B, and insure complete stability of the bar against lateral motion in all directions, and against twisting motion of the bar.

The apparatus consists of two units—a floating tool holder H, which rides along the work surface S, of a workplate or other body W, and a guiding frame F, which propels the apparatus and directs the floating movement of the tool holder. The apparatus is herein disclosed in connection with a horizontal workplate, in which case the frame F is propelled in a generally horizontal path over the workplate, and the tool holder and its guide bar B, oscillate in a generally vertical direction, although it will be understood that these directions merely typify one set of operating conditions, and that the apparatus is equally useful when traveling in other directions, as when the surface of the workplate or other body is inclined with respect to the horizontal.

The tool holder or tool support H comprises a surface-engaging member M, composed of a bracket 11, riding above the work surface S, on a suitable support, for example a wheel 12, journalled to the bracket 11, for free rolling action along the work surface. The tool is herein disclosed as a nozzle block 13, having a mounting plate 14, secured to the bracket 11, for supporting a plurality of sleeves 15, 16 and 17, in suitable angular and spaced relation with respect to one another, to accommodate cutting blowpipe nozzles 18, 19 and 20, for performing top-beveling, trimming, and under-beveling operations respectively on the edge of the workplate W, during a single pass of the apparatus. Suitable gas connections 22 connect the respective nozzles with sources of the usual oxygen, and combustible gas. The preheating flame mixture for the nozzles may be formed by individual conventional mixers, located within the sleeves 15, 16 and 17, or the gases may be premixed before they reach the connections 22. A set screw 23 holds each of the nozzle assemblies in operating position, within the respective sleeves.

The guide bar B extends vertically upward from the bracket 11, to which it is secured as by a dowel joint, locked together with a taper pin 24. The major portion of the guide bar is of uniform cross section, preferably of simple geometric shape, having faces disposed symmetrically about the periphery for engagement with the guide rollers G, although a bar of circular cross section sometimes may be employed, as where twisting of the bar does not affect the operation of the tool. The bar may be of generally rectangular cross section, that is, one having four symmetrically disposed side faces 31, or of triangular cross section, with guide rollers engaging three side faces. The longitudinal edges extending between adjoining longitudinal flat faces 31 may be substantially beveled or chamfered, either to form another set of faces, or to minimize the displacement of the spring-loaded guide rollers G, when the guide bar B is turned about its longitudinal axis to index the tool holder H, from one operating position to another. As shown in Fig. 2, the bar B comprises a generally square solid rod, with rounded longitudinal edges; a similar shape may be obtained by grinding four symmetrically disposed flat surfaces along a round bar. A manifold bracket 25 may be secured in any convenient manner to the top of the bar B, for supporting a conventional cutting oxygen manifold, preheat manifold, or a mixer assembly, and the like, whereby the gas conduits connecting the mixer and manifolds with the nozzles, oscillate as a unit with the holder H over the work surface S.

The frame F comprises a split clamp 26, secured to an arm A for connection with a propelling device, for example, the carriage of a portable machine of the type disclosed in Patent 2,183,605, dated December 19, 1939. A machine of this type ordinarily runs along track members, disposed in parallel relation to the path to be followed by the tool T; vertical deviations in the surface S, are compensated for by the floating tool holder. Bolts 27 hold the clamp 26 in adjustable frictional engagement with a cylindrical clamping surface 28, intermediate the ends of the hollow guide shell 21 of the frame F, whereby the relative positions of the arm A and guide shell, may be adjusted to properly orient the tool T, relative to the path of travel. It will be understood that although the present apparatus is disclosed in connection with a stationary workplate W, with means for propelling the frame F, the invention works equally well when the frame is fixed in position, and the relative motion provided by propelling the plate.

Anti-friction devices G, are provided between the frame F and the bar B, to provide free floating action of the bar B axially, within a guide shell 21, forming part of the frame F. Although the anti-friction devices are herein disclosed as a plurality of ball-bearing rollers 29, having double felt sealing washers 30, it will be understood that any equivalent devices, such as plain rollers or balls, may be employed with similar results. Furthermore, although the rollers are herein disclosed as being journalled to the guide shell 21 of the frame F, for rolling engagement with the faces 31, it will be understood that the device may operate in similar manner by journaling the plurality of rollers or similar devices to the bar B, or equivalent supporting member, for engagement with a smooth inner periphery of the guide shell 21.

The guide rollers G are located in spaced sets, preferably adjacent to the top and bottom of the guide shell 21. The rollers G of each set are spaced about the periphery of the bar B, so as to inhibit undesirable lateral play in all directions. This may be accomplished by the use of three or more rollers disposed about the periphery of the bar, so as to exert force components against the bar in all lateral directions. Such a condition is satisfied with a bar of triangular or hexagonal cross section, having symmetrically disposed rollers engaging three faces, but preferably use is made of four rollers, arranged to engage the respective side faces 31 of a square or octagonal bar, so that the rollers are located in quadrature, being journalled about shafts or spindles 32, located along mutually perpendicular axes.

The rollers G are journalled with respect to the frame so that no appreciable lateral lost motion exists between the bar and the rollers. However, it has been found that to insure substantially complete lateral stability, provision must be made to overcome the lost motion introduced by mechanical error, and by wearing of the parts. As herein disclosed the lost motion may be completely taken up by the use of resilient mounting means 33, for urging each set of rollers into closer contact with the bar B. Where three rollers are employed, the resilient mounting means 33 may be operative on but a single roller of each set, whereas when two pairs of rollers are employed, the resilient mounting means preferably is provided on one roller of each pair, so as to urge opposed rollers mutually closer, as shown in Fig. 2.

The resilient mounting means 33, are located in slotted tubular housings 34, which extend generally perpendicularly to the bar B at opposite ends of the guide shell 21. A compression spring 35, is located within the housing 34, adjacent to the outer closed end thereof. The inner end of the spring 35 engages a holder or roller mount 36, for the guide roller shaft or spindle 32, so as to urge the roller against the bar B, thereby taking up lateral lost motion, and inhibiting undesirable lateral play between the parts. The shaft 32 of each spring-loaded roller, extends at each end through a slot 37 formed in the housing 34, to limit the extreme positions of the roller. The remaining rollers preferably are enclosed to exclude dust, and other foreign particles and are mounted upon shafts or spindles 32, which are held tightly within circular openings 38, formed in the guide shell 21.

The resilient mounting means 33 for the guide rollers G, not only take up all lateral lost motion, but also provide an indexing means which may be employed, if desired, in rotating the bar B about its axis, to present new faces to the rollers, and to allow a change in the position of the tool relatively to the line of travel. Thus, for example, after the tool has completed a pass in one direction, it may be indexed 180° for a return pass by turning the bar B 180° about its longitudinal axis. In the case of a square bar B, the displacement of the rollers during indexing may be minimized, by beveling or chamfering the intermediate longitudinal edges, as previously mentioned, although a similar effect is obtained by employing a bar of octagonal stock.

The ends of the guide shell 21 may be closed by a felt seal 39, secured at each end of the shell, as indicated in Fig. 1. The seal 39 comprises a resilient wiper, in light frictional engagement with the periphery of the bar B, to maintain the outer faces free of slag or other foreign particles, and thereby insure smooth engagement between the rollers and the bar. A clamping plate 41 permits compressing the seal 39 in the manner of a packing gland, to compensate for wear.

A lock 42 may be provided, preferably at a point intermediate the spaced sets of rollers, for securing the bar B in fixed relation to the frame F. The lock 42 may comprise a bolt threaded through a reenforced portion 43 of the guide shell 21. The reenforced portion may be provided with a threaded sleeve insert 44, such as bronze or steel, to resist wear, and to insure smooth locking action. When the lock 42 is threaded tightly against the bar B, the movable parts are held in fixed position, as may be useful when initially adjusting the device. By withdrawing the lock 42 a slight degree, the tool support may float freely with respect to the frame F, but indexing of the bar is precluded by the engagement of the bolt with the adjoining longitudinal edges located between engaged faces. Repeated locking operations tend to damage the smooth faces of the bar B, so that if these portions then were engaged by the rollers G, the smooth floating action would be impaired. This difficulty is overcome by locating the lock 42 midway between the spaced sets of rollers, so that the portions affected by the lock 42, are not engaged by either set of rollers during normal operation. Although the degree of float may be varied by controlling the length of the bar, an oscillatory motion 3 inches to either side of the neutral position, has been found adequate for all ordinary operating conditions. Accordingly, the sets of rollers may be located 6 inches or more apart, and a 3 inch clearance may be provided at each end of the bar B for the floating action. Under these circumstances the sets of rollers are located substantially adjacent to the ends of the bar, at which point they provide a maximum degree of control over lateral play.

The invention is susceptible of various modifications without departing from the scope of the invention or sacrificing its advantages.

We claim:

1. Tool-guiding apparatus adapted to maintain a tool, such as a blowpipe, in angularly disposed relation to the surface of a plate or other body as said tool progresses along said surface, comprising a frame adapted to be propelled along a path relatively to said surface; a tool-holder comprising a bevel-cutting blowpipe supporting member, and a guide bar having a portion of uniform cross section extending from said member for longitudinal movement relative to said frame; and a plurality of anti-friction devices such as guide rollers journalled to said frame, said devices being disposed about said bar for engagement with the sides of said bar, at zones so spaced about the periphery thereof as to provide complete transverse stability of said guide bar; and said apparatus being constructed and arranged to permit turning of said guide bar about its longitudinal axis, to orient said bevel-cutting blowpipe.

2. Tool-guiding mechanism adapted to maintain a tool, such as a blowpipe, in predetermined relation to a work surface as said tool progresses relatively to said surface, comprising a frame adapted to be propelled along a path relatively to said surface; a floating tool holder comprising a surface-engaging member, and a guide bar of uniform cross section extending from said member, for free floating movement relative to said frame; a plurality of rotatable anti-friction devices operative between said frame and said bar, to guide the floating movement of said bar; and resilient means cooperating with at least one of said anti-friction devices, to take up lateral lost motion between said bar and said frame.

3. Tool-guiding mechanism adapted to maintain a tool, such as a blowpipe, in predetermined relation to a surface of a workpiece as said tool progresses relatively to said surface, comprising a frame adapted to be propelled along a path relatively to said surface; a floating tool holder comprising a surface-engaging member, and a guide bar of uniform cross section extending from said member for free floating movement relative to said frame; a plurality of sets of rotatable anti-friction devices journalled to said frame, said rollers being free to engage the sides of said bar at spaced points on its periphery, to exert forces on said bar in all lateral directions; and resilient means cooperating with at least one of said devices to compress said bar between said devices, to provide complete lateral stability of said floating tool holder.

4. Tool-guiding apparatus adapted to maintain a tool, such as a blowpipe, in predetermined angular relation in a plane transverse to the surface of a workplate as said tool progresses relatively along said workplate, said apparatus comprising a frame movable in a path relatively to said workplate; a floating tool-support comprising a bar of uniform generally rectangular cross section, said bar having a workplate-engaging member, and being longitudinally oscillatable relatively to said frame in accordance with undulations in said workplate; a plurality of sets of rollers journalled with respect to said frame at points spaced along said bar, said sets comprising rollers engaging each of the four side faces of said bar of rectangular cross section; and mounting means for supporting said frame for angular adjustment about the longitudinal center line of said bar.

5. Tool-guiding apparatus adapted to maintain a tool, such as a blowpipe, in predetermined relation to the surface of a workplate, as said tool progresses relatively along said workplate, said apparatus comprising a frame movable in a path relatively to said work-plate; a floating tool support comprising a bar of uniform generally rectangular cross section, said bar having a workplate-engaging member, and being longitudinally oscillatable relatively to said frame in accordance with undulations in said workplate; a plurality of sets of rollers journalled with respect to said frame at points spaced along said bar, said sets comprising rollers engaging each of the four side faces of said bar of rectangular cross section; and resilient mounting means continuously urging opposed rollers of said sets mutually closer, to take up lost motion in all lateral directions between said bar and said frame.

6. Tool-guiding apparatus adapted to maintain a tool, such as a blowpipe, in predetermined relation to the surface of a workplate as said tool progresses relatively along said workplate, said apparatus comprising a frame movable in a path relatively to said workplate; a floating tool support comprising a bar of square cross section, said bar carrying a workplate-engaging member, and being longitudinally oscillatable relatively to said frame in accordance with undulations in said workplate; and a plurality of sets of rollers journalled with respect to said frame at points spaced along said bar, said sets comprising rollers engaging each of the four side faces of said bar of square cross section, each of said sets of rollers comprising pairs, said respective pairs being journalled to said frame about mutually perpendicular axes, and at least one roller of each pair being provided with resilient mounting means continuously urging such roller into closer proximity to the other roller of such pair.

7. Tool-guiding apparatus adapted to maintain a tool such as a blowpipe in predetermined operating relation to a generally horizontal work surface, as said tool is propelled in a path relative to said work surface, said apparatus comprising a frame movable in a generally horizontal direction over said work surface; a floating tool support comprising a substantially vertical bar of uniform cross section, having symmetrically-disposed longitudinally-extending faces, said support including a work surface-engaging member adapted to oscillate said bar vertically, in accordance with irregularities in said work surface; a plurality of spaced sets of guide rollers journalled with respect to said frame, for engagement with the respective faces on said bar; the longitudinal edges of said bar located between adjoining engaged faces, being substantially beveled or chamferred; and resilient roller mounts movable on said frame, and adapted to urge at least one roller of each set into engagement with a face of said bar, said mounts being movable away from said bar sufficiently to allow said rollers to clear said edges, when said bar is pivoted about its axis, so as to index said tool support relative to said frame.

8. Apparatus as claimed in claim 7, including locking means adapted to inhibit indexing of said tool support, without interfering with the vertical floating movement of said support.

9. Tool-guiding apparatus adapted to maintain a tool, such as a blowpipe, in predetermined operating relation to a work surface as said tool is propelled in a path relative to said work surface, said apparatus comprising a frame movable over said work surface; a floating tool support comprising a guide bar of uniform cross section having longitudinally-extending guide faces, said support including a surface-engaging member adapted to oscillate said bar within said frame, in accordance with undulations in said work surface; a plurality of sets of guide rollers journalled to said frame at points spaced along said bar, for engagement with said guide faces; and locking means extending from said frame, and adapted to engage one of said guide faces at a point substantially midway between said sets of rollers, for securing said bar in fixed relation to said frame.

10. A spring-loaded guide roller mechanism for guiding a floating blowpipe supporting bar within a blowpipe-propelling frame, said mechanism comprising a generally tubular slotted housing, extending substantially perpendicularly from said bar; a compression spring located in the end of said housing remote from said bar; a spindle holder located between said spring and said bar, and urged by said spring toward said bar; a spindle mounted on said holder with the ends of said spindle projecting through and guided by said slotted housing; and a roller journalled on said spindle for resilient rolling engagement with said bar.

11. For use with a cutting machine having a carriage movable relatively to a workpiece, a guide shell adapted to be mounted on said carriage to move therewith, a guide bar longitudinally slidable in said shell, a bevel-cutting nozzle carried by said guide bar and disposed at an oblique angle to the longitudinal axis thereof, a plurality of anti-friction devices such as guide rollers journalled in said shell and engaging said guide bar, said devices being disposed about said bar at zones so spaced about the periphery thereof as to provide complete lateral stability of said guide bar, and means for mounting said guide shell on said carriage for angular adjustment about the longitudinal axis of said guide bar, to set said bevel-cutting nozzle in any one of a number of different cutting positions.

12. Tool-guiding apparatus adapted to maintain a tool such as a blowpipe in operating relation to a generally horizontal work surface as said tool is propelled in a path relative to said work surface, said apparatus comprising a frame movable in a generally horizontal direction over said work surface, a tool support comprising a bar slidably mounted in said frame; and a bevel-cutting blowpipe carried by said bar; said frame comprising an outer member secured to a propelling device, and an inner member slidably receiving said bar, and having a cylindrical surface turnable in said outer member to orient said bevel cutting blowpipe.

13. Mechanism for movably supporting a tool, such as a blowpipe, while said tool is propelled by a carriage along a surface of a workpiece, said mechanism comprising a hollow guide shell adapted to be secured to said carriage to move therewith along said surface; a bar freely movable axially in said shell and projecting from one end thereof, said bar having a plurality of faces extending lengthwise thereof; a tool secured to such projecting end of said bar; anti-friction devices carried by said shell and severally bearing against said faces of said bar, to facilitate the free movement of said bar axially of said shell and to retain said bar and said tool in a selected operating position; said bar being turnable about its longitudinal axis and relatively to said anti-friction devices, to set said tool in any selected one of a number of different operating positions; and work-engaging means secured to the projecting end of said bar and adapted to engage a surface of a workpiece to move said bar relatively to said anti-friction devices and axially relatively to said shell in response to unevenness of said surface, to maintain said tool in a predetermined operating relation to successive portions of said surface while said tool is propelled along said surface.

14. Mechanism for movably supporting a tool, such as a blowpipe, while said tool is propelled by a carriage along a substantially horizontal surface of a workpiece, said mechanism comprising a hollow vertical guide shell adapted to be secured to said carriage to move therewith and horizontally along said surface; clamping means engaging said shell intermediate its ends and adapted to secure said shell to said carriage; a solid bar of substantially square cross section freely movable vertically and axially in said shell and projecting from the lower end thereof; a tool secured to such lower end of said bar; two sets of anti-friction rollers carried by said shell, one set located above and the other set located below said clamping means and the rollers of each set severally engaging the four longitudinal faces of said square bar, each set of rollers including yieldably-mounted rollers, said sets of anti-friction rollers being constructed and arranged to retain said bar and said tool in a selected operating position and to facilitate the free vertical movement of said bar and said tool; said bar being turnable at will about its longitudinal axis and relatively to said sets of anti-friction rollers to locate said tool in any selected one of four different operating positions; and a work-engaging wheel secured to said lower end of said bar and adapted to roll along a surface of a workpiece and move said bar relatively to said anti-friction rollers and axially relatively to said shell in response to unevenness of said surface, to maintain said tool in a predetermined operating relation to successive portions of said surface while said tool is propelled along said surface.

RUDOLPH CHELBORG.
HANS PUFAHL.